United States Patent [19]

Lewis et al.

[11] 4,347,287
[45] Aug. 31, 1982

[54] SEGMENTED PULTRUSIONS COMPRISING CONTINUOUS LENGTHS OF FIBER HAVING SELECTED AREAS ALONG THE LENGTHS CONTAINING RESIN MATRIX IMPREGNATIONS

[75] Inventors: Armand F. Lewis; Chen-Chi M. Ma; Hoa Quach; Edward J. Krasnicki, all of Erie, Pa.

[73] Assignee: Lord Corporation, Erie, Pa.

[21] Appl. No.: 178,226

[22] Filed: Aug. 14, 1980

[51] Int. Cl.³ .......................... B32B 3/10; D02G 3/36
[52] U.S. Cl. .................................. 428/378; 264/136; 425/95; 425/102; 428/394; 428/395; 428/399
[58] Field of Search ................. 428/378, 394, 395, 399

[56] References Cited

U.S. PATENT DOCUMENTS

| | | | |
|---|---|---|---|
| 2,871,911 | 2/1959 | Goldsworthy et al. | 154/1.7 |
| 2,878,548 | 3/1959 | Lohr et al. | 428/399 |
| 2,918,104 | 12/1959 | Scott et al. | 154/1.7 |
| 3,103,098 | 9/1963 | Dyer | 428/399 |
| 3,235,429 | 2/1966 | Boggs | 156/166 |
| 3,244,570 | 4/1966 | Boggs | 156/178 |
| 3,244,784 | 4/1966 | Boggs | 264/137 |
| 3,374,132 | 3/1968 | Boggs | 156/271 |
| 3,644,866 | 2/1972 | Deardurff | 428/378 |
| 3,928,519 | 12/1975 | Kashiyama et al. | 428/399 |
| 3,932,687 | 1/1976 | Okamoto et al. | 428/395 |
| 4,048,371 | 9/1977 | Brumlik | 428/399 |
| 4,132,828 | 1/1979 | Nakamura et al. | 428/378 |
| 4,143,199 | 3/1979 | Bardon et al. | 428/399 |

FOREIGN PATENT DOCUMENTS 1546764  5/1979  United Kingdom .

OTHER PUBLICATIONS

"Pultrusion"; Leonard S. Meyer P.E.; 25th Annual Technical Conference, 1970, Reinforced Plastics/Composites Division.
"Process and Economic Factors for Pultrusion"; J. Albert Rolston, Polym-Plast. Technol. Eng., 13(i); 65–82, (1979).
The Society of the Plastics Industry, Inc.

Primary Examiner—James C. Cannon
Attorney, Agent, or Firm—Thomas L. Kautz

[57] ABSTRACT

A system and method for forming a segmented pultruded shape is provided in which a continuous length of fiber reinforcements are impregnated with a matrix material and then formed into a continuous series of alternating rigid segments and flexible segments by curing the matrix material impregnating the rigid sections and removing the matrix material impregnating the flexible sections.

4 Claims, 9 Drawing Figures

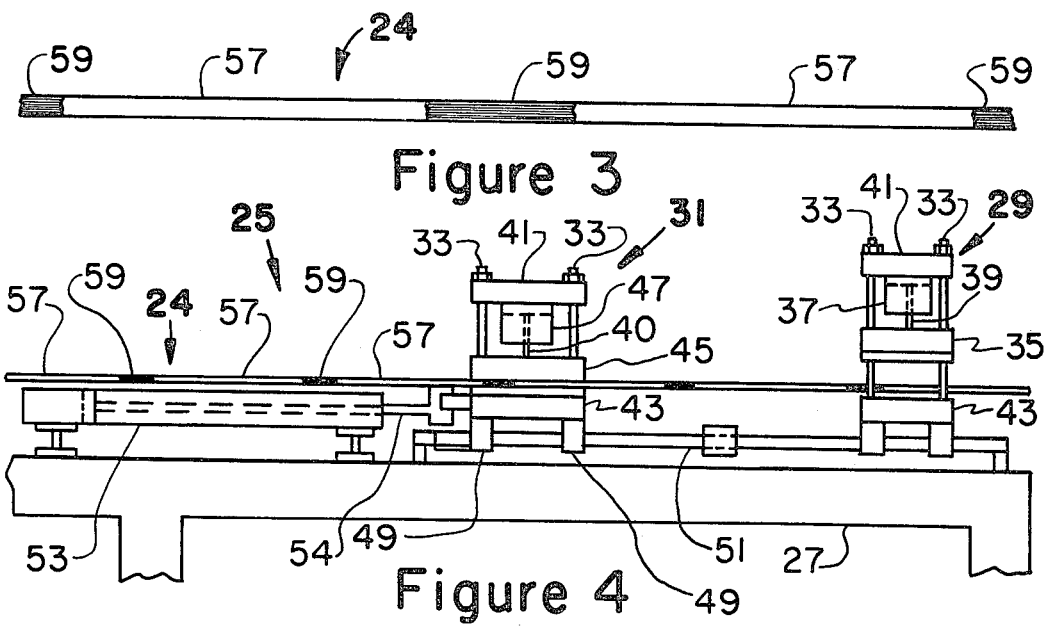
Figure 3
Figure 4
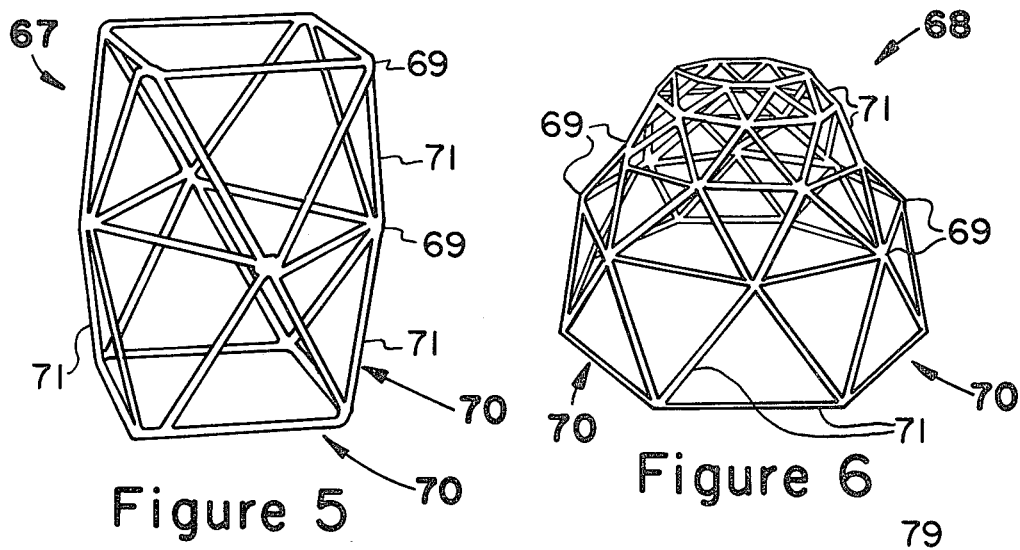
Figure 5
Figure 6
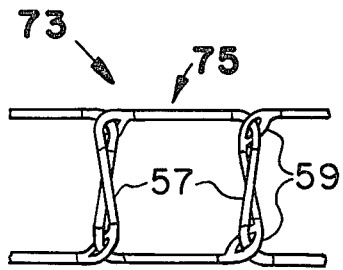
Figure 7
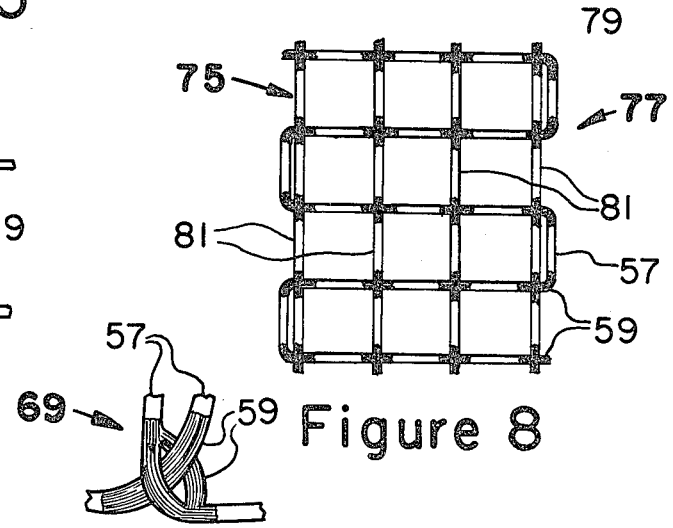
Figure 8
Figure 9

SEGMENTED PULTRUSIONS COMPRISING CONTINUOUS LENGTHS OF FIBER HAVING SELECTED AREAS ALONG THE LENGTHS CONTAINING RESIN MATRIX IMPREGNATIONS

FIELD OF THE INVENTION

The subject invention relates generally to the field of pultrusion, and, more specifically, to a system and method for pultruding a continuous length of resin impregnated fiber reinforcement to form a segmented pultruded shape having alternating cured and uncured sections.

BACKGROUND OF THE INVENTION

Generally, pultrusion can be defined as a process for producing reinforced plastic geometrical shapes in a continuous length by pulling a resin impregnated fiber reinforcement through a forming and curing die. Pultrusion dates back to the early 1950's where it was initially used to form round bar stock for the fishing rod industry. The systems, method and apparatus for forming pultruded shapes remained at this level for several years until the late 1960's when improvements allowed manufacturers to form various structural shapes used in a number of applications including corrosive and weather resistant ladders, gratings, hand rails, hoods, walkway supports, and structural elements for buildings such as greenhouses and the like. Today, the pultrusion process is widely used in several countries for producing either hollow or solid reinforced composites in continuous lengths of constant cross section from 1/32 inch diameter rods to structural beams having flange dimensions of 8 inches or more.

In most applications, the pultruded shapes are assembled in a piece-by-piece manner using mechanical or chemical joining techniques. It has been found, however, particularly in those applications utilizing larger pultruded shapes to form trusses and other structural elements, that the joints of such structures are much more likely to fail than the pultruded sections therebetween using existing joining techniques. Moreover, the pultrusion technology developed to date is capable of producing only continuous lengths of fiber reinforced material having a constant cross section. Thus, formation of generally sharp curved corners in structural applications is not possible using present techniques.

SUMMARY OF THE INVENTION

The subject invention provides a system and method for forming a continuous length of a segmented pultruded shape in which alternate portions are cured to form rigid sections and uncured to form flexible sections. As discussed in detail below, the segmented pultruded shape of the subject invention may be utilized in a variety of applications for which conventional pultruded shapes are inappropriate. Configurations including geodesic and column structures, foldable ladder structures, netting, fence-type structures and other applications may be formed by folding the segmented pultruded shape at the flexible sections and temporarily connecting overlapping flexible sections together as the structure takes shape. The rigid sections act as struts or load carrying members and the overlapping flexible sections form the nodes or joints of each structure. Once the structure is completed, the flexible sections forming each joint are impregnated with a matrix material and then cured in place.

The system and apparatus for forming the segmented pultruded shape includes a pneumatically or hydraulically operated pulling means which pulls a plurality of continuous rovings of fiber reinforcements from a series of creels to a resin bath where each individual fiber is impregnated with a matrix material. The fibers are then drawn through a preforming means in which the fiber reinforcements are preliminarily shaped in the form of the final cross section desired, and excess matrix material is removed. The pulling means is operable to then pull the fiber reinforcements through a die where the final cross section is obtained. Curing means, associated with the die, acts to cure that portion of the fiber reinforcements within the die while the length of fiber reinforcements in advance of the die impregnated with matrix material remains uncured.

Uniquely, the pulling means of the subject invention is calibrated to quickly advance a selected portion of uncured fiber reinforcements through the die, after curing of the fiber reinforcements within the die, such that the matrix material impregnating the uncured portion remains uncured. Thus, the length of fiber reinforcements exiting the die after each pulling sequence of the pulling means includes a section of rigid, cured fiber reinforcements and a contiguous secton of flexible, uncured fiber reinforcements. Washing means is provided to quench the uncured section of fiber reinforcements for cooling the matrix material and then removing it. The result is a continuous length of a segmented pultruded shape having alternate rigid, cured sections or segments and flexible, resin-free segments.

Therefore, it is an object of the present invention to provide a segmented pultruded shape having alternate rigid cured sections and uncured flexible sections.

It is another object of the present invention to provide a system for forming a segmented pultruded shape including means to advance selected portions of the pultruded shape through a die having curing means at a sufficient rate to avoid curing, and means to wash the resin as needed from such selected portions to form a resin free, flexible section.

It is still another object of the present invention to provide a segmented pultruded shape having alternate rigid and flexible sections which may be used to fabricate a variety of structural configurations by selectively joining the flexible sections in place within a completed structure and then applying a matrix material to cure such flexible sections.

DESCRIPTION OF THE DRAWINGS

Objects in addition to the foregoing will become apparent upon consideration of the following descriptions taken in conjunction with the accompanying drawings wherein:

FIG. 3 is an isometric view of the segmented pultruded shape herein formed by the apparatus of FIG. 1.

FIG. 4 is an isometric view of the pulling mechanism of the apparatus in FIG. 1.

FIG. 5 is a prospective view of a column structure formed from the segmented pultruded shape of the subject invention.

FIG. 6 is a perspective view of a geodesic structure formed from the segmented pultruded shape herein.

FIG. 7 is a perspective view of a continuous ladder-type structure formed by connecting a plurality of segmented pultruded shapes.

FIG. 8 is a perspective view of a grid structure formed with a plurality of segmented pultruded shapes.

FIG. 9 is an enlarged partial perspective view of the joints of the structures shown in FIGS. 7 and 8.

DETAILED DESCRIPTION OF THE INVENTION

Figure 1:
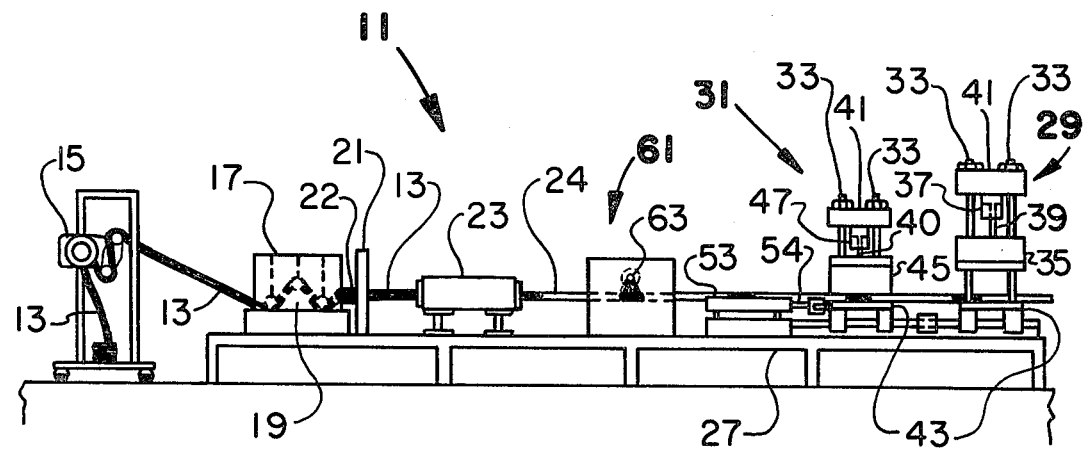
FIG. 1 is an isometric view of the apparatus for forming the segmented pultruded shape of the subject invention.
Figure 2:
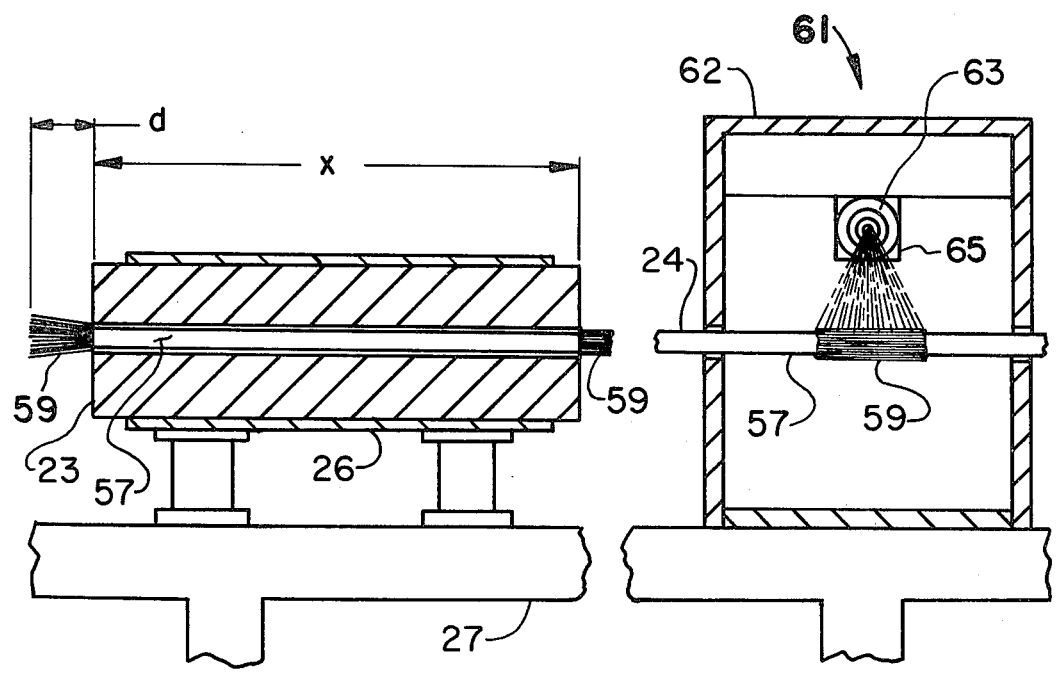
FIG. 2 is an isometric view of the die and quencher means of the apparatus of FIG. 1.

Referring now to the drawings, and in particular to FIGS. 1 and 2, the system and apparatus for forming the segmented pultruded shapes of the subject invention is labelled generally with a reference 11. A plurality of fiber reinforcements 13 are reeled from a series of creels 15 into a resin bath 17 filled with thermosetting resin 19. The fiber reinforcements 13 may be in the form of a continuous roving or unidirectional reinforcement oriented generally parallel to one another, where tensile strength along the longitudinal axis of the pultruded shape is desired. Multidirectional reinforcement in the form of a fabric or mat may be added to the continuous roving or unidirectional reinforcement to obtain a pultruded shape having transverse strength in addition to tensile strength. A variety of fibrous materials may be used to form the fiber reinforcements 13, with glass fiber being the most popular due to its low cost and relatively high tensile strength. Graphite, boron and aramid fibers may be used as an alternative to glass fiber in applications where greater tensile strength is required, but their increased cost may limit their usefulness in some instances. In addition, mixtures of the filament materials may also be utilized in particular applications as desired.

Each roving or strand of the fiber reinforcements 13 is impregnated in the resin bath 17 by a matrix material such as a thermosetting resin 19. Polyester and epoxy resins are most suitable, with polyester resin being preferred due to its fast cure time. In addition to these matrix materials, other resins such as vinyl esters and acrylic resins may also be utilized. Each of the above-identified resins can be formulated to suit the end use requirements of the pultruded shape herein including corrosion resistance, flame resistance, insulating properties and the like. In addition, peroxide compounds may be introduced into the resin bath 17 when utilizing polyester or vinyl ester resins 19 to act as catalyst for initiating the polymerization of unsaturated resin. The curing process may be accelerated by providing promoters such as dimethyl amine or mangenese naphthalene to react with the peroxide compounds. The resin bath 17 may also contain fillers such as calcium carbonate, talc, aluminum silicate and silica to reduce costs and to reduce the exothermic heat generated during polymerization. Where a certain color is desired, pigments may be added to the resin bath 17.

The resin impregnated fiber reinforcements 13 are then drawn through a preforming device 21 having an opening 22 which generally conforms to the desired cross section of the pultruded shape to be made, which is labelled generally with the reference 24 in FIG. 1. The preforming device 21 performs two functions. First, the fiber reinforcements 13 are reduced from a random mass of continuous rovings or unidirectional reinforcements to a shape which reasonably approximates that of the finished pultruded shape 24 desired. In addition, as the fiber reinforcements 13 are preshaped and drawn together by preforming device 21, excess resin 19 is eliminated in preparation for final formation of the pultruded shape 24. The material utilized to construct the preforming device 21 is preferably steel, although it is contemplated that other inert and relatively rigid materials may be utilized such as polyethylene and similar substances.

The now preshaped fiber reinforcements 13 are then drawn through an elongated die 23 in which the fiber reinforcements 13 are both formed into the final pultruded shape 24 and cured. Die 23 is formed of steel, but may be plated with chrome to reduce the coefficient of friction, extend the die life and improve the release of resin 19 from the walls of die 23 as the fiber reinforcements 13 are drawn therethrough. Depending upon the cross section of the pultruded shape 24 desired and the type of resin utilized, die 23 of the subject invention may be provided with a variety of curing means. In one embodiment, passageways are formed in die 23 in communication with the fiber reinforcements 13 through which a heated fluid such as oil is circulated to effect curing of the resin 19. In the alternative, as shown in FIG. 2, an electrical heating means or coil 26 may be wrapped around die 23 to provide the heat necessary for curing. The thermocuring of fiber reinforcements 13 within die 23 using direct heat conduction is most efficiently utilized for relatively thin cross sections. Larger cross sections may be cured by coating the inner surface of the die 23 with Teflon ® or a suitable equivalent and utilizing radio frequencies to heat and cure the thermosetting resin 19. Problems of internal cracking and delamination which may be encountered by curing larger cross sections with direct heat conduction are avoided by using radio frequencies since the cure is initiated from the center of the mass of the pultrusion and progresses outwardly toward the outer surfaces. Die 23 may also be adapted for so-called augmented curing wherein a combination heated die and radio waves are utilized for curing pultruded shapes of relatively thick cross sections. Augmented curing substantially decreases curing time, but the system is more expensive and may not be cost effective in some applications.

Referring now to FIGS. 2 and 4, two additional portions of the system 11 herein are shown. A pulling machine, labelled generally with the reference 25 in FIG. 4 is provided for advancing the fiber reinforcements 13 from the creels 15 through the resin bath 17 to the preforming device 21 and then through die 23. Pulling machine 25 consists of a base 27, a gripping assembly 29 and a carriage assembly 31. Gripping assembly 29 is secured to the base 27 of pulling machine 25 at the end remote from die 23, and is generally rectangular in shape with four upstanding rods 33 disposed at each corner of a top plate 41 and bottom plate 43 along which a rectangular clamping member 35 is slideably mounted. In the views of the gripping and carriage assemblies 29 and 31 shown in the Figures, only one side is shown and it should be understood that the side not shown is essentially identical. A pneumatic or hydraulic first clamping piston 37 having a plunger 39 is mounted at one end to top plate 74 of gripping assembly 29, with the plunger being fixed to clamping member 35. As discussed more fully below, in response to an electrical signal the first clamping piston is activated to reciprocate plunger 39, and in turn clamping member 35, upwardly and downwardly along rods 33.

The carriage assembly 31 is similar to gripping assembly 29. It too includes four rods 33 disposed at the four corners of a top plate 41 and bottom plate 43 along which a second clamping member 45 is slideably disposed. A second clamping piston 47 attached at one end to the top plate 41 and having a plunger 40 attaching to the second clamping member 45, reciprocates second clamping member along rods 33 in response to an electical signal. Mounted at each corner of bottom plate 43 of the carriage assembly 31 are guides 49 which are moveable along a pair of trackes 51 mounted parallel to one another on the base 27 of pulling machine 25. A pair of pneumatic or hydraulic drive pistons 53, having plungers 54, are mounted to the base of pulling machine 25 adjacent die 23. The plungers 54 attach to carriage assembly 31 and are operable to reciprocate carriage assembly 31 toward and away from the fixed gripping assembly 29 along tracks 51.

The operation of pulling machine 25 is synchronized with the formation process of the segmented pultruded shapes 24 of the present invention in the following manner. The fiber reinforcing material 13 is pulled from the creels 15, through the resin bath 17 and preforming device 21 to the die 23 in intermittent strokes or pulling sequences. Specifically, electronic circuitry (not shown) activates the first clamping piston 37 of gripping assembly 29 to move first clamping member 35 into secure engagement with the pultruded shape 24 resting on the surface of bottom plate 43. Gripping assembly 29 maintains tension on the pultruded shape 24 during the curing process within die 23. As the curing process is progressing, the electronic circuitry activates drive pistons 53 to move the carriage assembly 31 along tracks 51 into a position remote from gripping assembly 29. Upon completion of curing, the clamping piston 47 of carriage assembly 31 is activated to move second clamping member 45 downwardly into engagement with the pultruded shape 24 disposed on bottom plate 43. At the same time, the clamping piston 37 of gripping assembly 29 is activated to release pultruded shape 24 from between the first clamping member 35 and bottom plate 43. The plungers 54 of drive pistons 53 then reciprocate carriage assembly 31 along tracks 51 to a position adjacent gripping assembly 29, thus advancing the pultruded shape 24 a fixed distance along the length of system 11.

At the completion of the pulling stroke of drive pistons 53, the first clamping piston 37 of gripping assembly 29 is activated by the electronic circuitry and plunger 39 moves first clamping member 35 into engagement with the pultruded shape 24 as another curing operation begins. Simultaneously, the pultruded shape 24 is released by the carriage assembly 31 and drive pistons 53 are again activated to move carriage assembly into position remote from gripping assembly 29 in preparation for another pulling sequence. The operation of pulling machine 25 is thus intermittent, with each pulling sequence being timed to allow complete curing of the fiber reinforcements 13 within die 23.

As discussed above, the fiber reinforcements 13 are completely impregnated with resin 19 upon leaving the resin bath 18 and preforming device 21. Referring now to FIG. 2, it will be observed that the length of fiber reinforcements 13 contained within die 23 and labelled generally as portion "x", undergo curing within die 23 and exit therefrom with a smooth rigid surface of uniform cross section. That portion of the fiber reinforcements 13 in advance of die 23 are merely impregnated with resin 19 which has not yet cured. For purposes of discussion, a small length of the fiber reinforcements 13 in advance of die 23 are identified as being equal to a distance "d". Unlike any known prior art pultrusion processes, the pulling machine 25 of the subject invention is calibrated to advance the fiber reinforcements 13 a distance equivalent to x plus d during each pulling sequence. That portion of the fiber reinforcements 13 in advance of die 23 labelled d, are moved quickly through the die 23 to avoid curing. The result, as shown in FIG. 3A, is a segmented pultruded shape 24 in which cured rigid sections 57 are disposed between uncured flexible sections 59.

As mentioned above, the uncured flexible section 59 having a length "d" is quickly pulled through the die 23 together with rigid section 57 having a length "x" to avoid curing. It should be understood that the relative length of sections 57 and 59 need not be as shown, but can be varied as desired in several ways. The length of die 23 may be reduced or elongated to shorten or extend the length of the rigid section 57 to be cured. In the alternative, pulling machine 25 may be calibrated to execute two or more pulling sequences in which a length of fiber reinforcements 13 equivalent to the length of a single rigid section 57 are pulled through die 23. A continuous rigid section 57 of any desired length could thus be produced. A flexible section 59 could then be formed by executing a pulling sequence wherein a length of fiber reinforcements 13 greater than the length of rigid sections 57 is pulled through die 23. Similarly, the length of the flexible sections 59 could be varied as desired by simply adjusting the pulling machine 25 to pull different lengths of uncured fiber reinforcements 13 (in advance of die 23) through die 23.

Referring again to FIG. 2, a quencher labelled generally with the reference 61, is shown. Quencher 61 consists of a cabinet 62 having a jet spray 63 disposed through an inlet 65. The uncured flexible section 59 of the pultruded shape 24 which is drawn through die 23 at a sufficient speed to avoid curing, remains impregnated with resin 19 after exiting die 23. Unless the thermosetting resin 19 is removed it would cure by conduction of heat from the adjacent rigid sections 57 which have been heated in die 23.

Depending upon the particular application for which the segmented pultruded shape is intended, the quencher 61 may either cool or remove the resin 19 from flexible sections 59. If structural members (discussed below) are to be made immediately after the formation of pultruded shape 24, the quencher 61 is fitted with a water line and the jet spray 63 merely quenches each flexible section 59 with water for cooling to avoid rapid curing of the resin 19. The pultruded shape 24 is then formed into the desired configuration and the resin 19 on each flexible section is allowed to cure. Where the pultruded shape 24 will be shipped to a remote location for assembly or stored, a resin dissolving solvent is forced, under pressure, through jet spray 63 to remove as much resin 19 as possible from each flexible section 59.

The system 11 of the subject invention thus produces a unique segmented pultruded shape 24 having alternate rigid sections 57 formed of cured fiber reinforcements 13 and flexible sections 59 formed of uncured fiber reinforcements 13. The segmented pultruded shape 24 of the present invention, which may be formed in a variety of cross sections, can be utilized as the basic structural link or element in a virtually unlimited number of applications. In FIG. 5 for example, a continuous length of the segmented pultruded shape 24, having rigid sections 57 of equal length and flexible sections 59 of shorter but uniform length, is formed in a geometrically symmetrical column structure 67. A geodesic dome structure 68, shown in FIG. 6, may also be formed wherein the length of rigid sections 57 is progressively shorter from the base portion of the structure 68 to the top. In this application, a plurality of separate lengths of the pultruded shape 24 are utilized, each having rigid sections 57 of different lengths.

As discussed above, structures made from known types of pultruded shapes generally utilize mechanical or adhesive connecting means to attach one pultruded shape to another. Undue stress concentrations and failure of the joints in such structures have presented design problems and have limited the types of applications for which such pultruded shapes may be used. In contrast, structures 67 and 68 are fabricated without conventional mechanical or adhesive joining techniques. As shown in FIGS. 5 and 6, the structures 67 and 68 consist of a plurality of triangular-shaped structural units 70 formed by simply folding or bending the pultruded shape 24 at the flexible sections 59. The column structure 67 may be formed of a continuous length of the segmented pultruded shape 24 having rigid sections 57 of equal length, or of several separate but identical lengths of the segmented pultruded shape 24. As mentioned above, geodesic structure 68 includes a number of lengths of pultruded shapes 24 with rigid sections 57 of varying lengths. The flexible sections 59 form the corners of each individual triangular-shaped structural unit 70 and overlapping flexible sections 59 are temporarily joined together by a fiber, strand, chord or any other suitable means as the structures 67 and 68 are constructed. Two or more overlapping flexible sections 59 thus form the nodes or joints 69 of the structures 67 and 68, and the rigid sections 57 in between the joints 69 act as structural links or struts 71. Once the structures 67 or 68 are completely fabricated, resin 19 is applied to the flexible sections 59 at each joint 69 as needed and cured in place to provide the necessary rigidity and stability.

Unlike trusses or other structures formed of prior art pultruded shapes, no mechanical or adhesive connecting means are utilized to form the joints 69 of the structures 67 and 68 herein. Moreover, the column structure 67 of FIG. 5 may be formed of a continuous length of the segmented pultruded shape 24 thus simplifying fabrication, reducing costs and improving the overall structural integrity.

In addition to the structural applications of the segmented pultruded shape 24 described above, there are a wide variety of other uses for this concept for which conventional pultruded shapes are totally inadequate. As shown in FIGS. 7 and 8 for example, a continuous length of the pultruded shape 24 is formed in a ladder-type structure 73 in which the rigid sections 57 are inserted through the individual fiber reinforcements 13 of selected flexible sections 59 to form a plurality of adjoining, rectangular structural units 75. The flexible sections 59 of each rectangular unit 75 which are intertwined with one another may be coated with resin 19 and cured to form joints 69 (see FIG. 9), or left uncured depending upon the particular application. In FIG. 8, a grid-like structure 77 is provided in which a continuous length 79 of the segmented pultruded shape 24 is intertwined with four separate lengths 81 of pultruded shape 24 extending vertically at spaced intervals as shown, to form a plurality of regularly spaced rectangular structural units 75.

It is contemplated that the rectangular structural units 75 may be utilized in a number of applications were rope, hemp, nylon, yarn and similar substances are now used as for netting and the like. The segmented pultruded shape 24 formed in rectangular structural units 75 may also replace metals in some applicaions, particularly for fences, gates and similar structures. Not only will resin impregnated fiber reinforcement provide better corrosion resistance than steel rod or cable and greater strength than fabric, rope braid, or nylon, but protective coatings such as urethane or other polymeric materials may be applied to the outer surface for better performance and more durability in various applications.

Other potential applications of the segmented pultruded shape 24 of the subject invention include the fabrication of towers for supporting microwave equipment, water wave height measurement instrumentation, radio and television broadcasting and receiving equipment, and aerials. The high tensile strength of the fiber reinforcements 13 which form the segmented pultruded shape 24 also make the subject invention useful for the reinforcement of concrete and similar applications.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A segmented pultruded shape comprising a continuous length of a plurality of fiber reinforcements impregnated with a matrix material, said length of fiber reinforcements having been formed into a continuous series of alternating rigid segments and flexible segments, the matrix material impregnating said rigid segments having been cured and the matrix material impregnating said flexible segments having been removed.

2. The segmented pultruded shape of claim 1 wherein said matrix material is a thermosetting resin.

3. The segmented pultruded shape of claim 1 wherein said fiber reinforcements are a plurality of continuous rovings formed of glass, graphite, boron or aramid fibers or mixtures thereof.

4. The segmented pultruded shape of claim 1 wherein said rigid segments are of constant cross section.

* * * * *

UNITED STATES PATENT AND TRADEMARK OFFICE
Certificate

Patent No. 4,347,287            Patented August 31, 1982

Armand F. Lewis, Chen-Chi M. Ma, Hoa Quach and Edward J. Krasnicki

Application having been made by Armand F. Lewis, Chen-Chi M. Ma, Hoa Quach, and Edward J. Krasnicki the inventors named in the patent above-identified, and Lord Corp., Erie, Pa., a Corp. of Pa., the assignee, for the issuance of a certificate under the provision of Title 35, Section 256, of the United States Code, deleting the names of Chen-Chi M. Ma, Hoa Quach, and Edward J. Krasnicki as joint inventors, and a showing of proof of facts satisfying the requirements of the said section having been submitted, it is this 7th day of Feb., 1984, certified that the names of the said Chen-Chi M. Ma, Hoa Quach, and Edward J. Krasnicki are hereby deleted from the said patent as joint inventors with the said Armand F. Lewis.

Fred W. Sherling,
*Associate Solicitor.*